(No Model.)

I. L. ATWOOD.
METHOD OF MAKING CHAIN.

No. 507,346. Patented Oct. 24, 1893.

Witnesses
Chas H. Smith
J. Staib

Inventor
Irving L. Atwood
per Lemuel W. Serrell
Atty

UNITED STATES PATENT OFFICE.

IRVING L. ATWOOD, OF WATERBURY, CONNECTICUT.

METHOD OF MAKING CHAIN.

SPECIFICATION forming part of Letters Patent No. 507,346, dated October 24, 1893.

Application filed December 21, 1892. Serial No. 455,866. (No specimens.)

*To all whom it may concern:*

Be it known that I, IRVING L. ATWOOD, a citizen of the United States, residing at Waterbury, in the county of New Haven and State of Connecticut, have invented an Improvement in Safety or Plumbers' Chains, of which the following is a specification.

Safety or plumber's chains have heretofore been made of links cut out from sheet metal threaded together and bent to shape in forming the chain. In these chains the bent metal portion forming the eye of each link is flat, and in passing through the round ended mortises of the adjacent link only the edges of the eyes came in contact as bearing surfaces. This produces a friction which rapidly wears away the eye portions of the links; besides, even in new chains these central portions forming the eyes are very much weaker than the mortised portions, which are double, the metal in each mortised portion being of the same thickness as the metal of the eye portions. These safety or plumber's chains as manufactured are very wasteful of stock, the shape thereof requiring in the stamping or cutting operation the removal of a number of pieces which can only be utilized as scrap.

In cases where chains have been made of links with eyes or mortises near the ends, they have either been forged, cast or otherwise formed from blanks and the central portion of each link has been much smaller in cross section than the diameter of the eyes or mortises near the ends of the link, and the ends of the links have not been flattened and spread in forming the mortises so as to obtain the required strength with as little metal as possible.

In my improvement the links are made from lengths of wire the respective ends of which are flattened and mortised and the central portion from which the eye is formed is round in cross section and its curved surface takes an even bearing in the rounded ends of the mortises through which it is threaded, and the flattened mortised portions of each link as stamped up may be of such thickness that when taken together they are of approximately the same sectional area as the metal of the central portion for the eye and are consequently of approximately the same strength, and there is very little scrap or waste of stock.

Figure 1:
Figure 2:
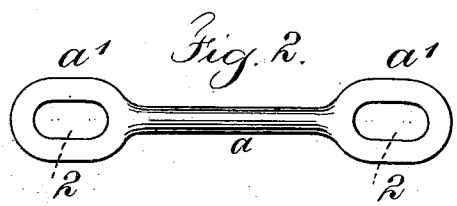
Figure 3:
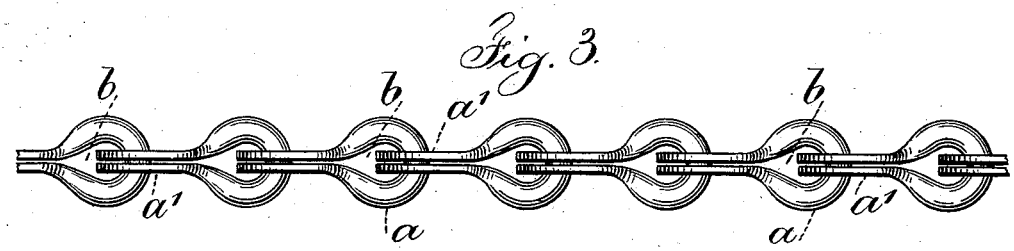
Figure 4:
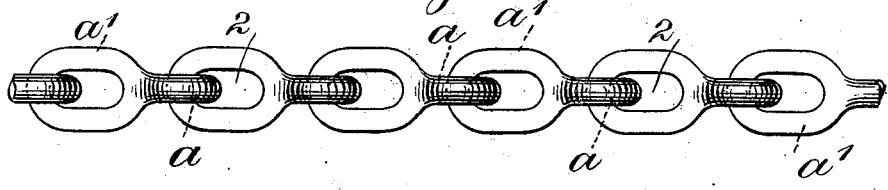

In the drawings, Figure 1 represents a section or length of wire. Fig. 2 represents the same when the ends are flattened and mortises made therein. Fig. 3 represents by plan a chain made up of links according to my improvement, and Fig. 4 is an edge view of the same.

The links are made from lengths or sections $a$ of wire of any desired size and material, and either round or polygonal in cross section; the term wire, as understood, not being at all limited to that which in cross section is round. The respective ends $a'$ of these lengths or sections $a$ are flattened and mortises 2 are made therein, the wire remaining of the desired shape between the respective flattened ends $a'$.

The mortises may be made by stamping or cutting out pieces of metal to form the mortises or by spreading the metal from a slit to the desired shape without appreciable waste. After the ends are flattened and the mortises made therein these portions are bent up, the wire center $a$ forming the eye $b$ of the link and the flattened ends $a'$ being brought adjacent and parallel to each other or nearly so. These links are threaded together in the usual manner of making such chains. The outline or edges of the flattened portions $a'$ may be shaped by the die in stamping up the flattened ends and forming the mortises. The mortises are preferably made with rounded ends and of a width slightly greater than the diameter of the wire, the curved surface of the metal of the eye taking an even bearing in the ends of the mortises. The flattened portions of the links may be bent more or less closely together and be either straight or curved.

I do not claim a chain made from a cast or forged blank, neither do I claim spreading the metal to form eyes at the ends of the link, the center portion of the link being forged or reduced in diameter previous to bending the same up into shape.

I claim as my invention—

The method herein specified of forming plumbers' or safety chains from wire, consisting in cutting the wire into lengths, flattening the ends of the blanks and opening in the flattened portions mortises or eyes of a width slightly greater than the diameter of the wire, and bending up the links to form the wire at the central portions of the links into eyes and passing these wire eyes through the mortises of the adjacent links in forming the chain, substantially as set forth.

Signed by me this 29th day of November, 1892.

IRVING L. ATWOOD.

Witnesses:
JOHN H. HURLBUT,
JOHN L. SCOTT.